United States Patent Office 3,475,522
Patented Oct. 28, 1969

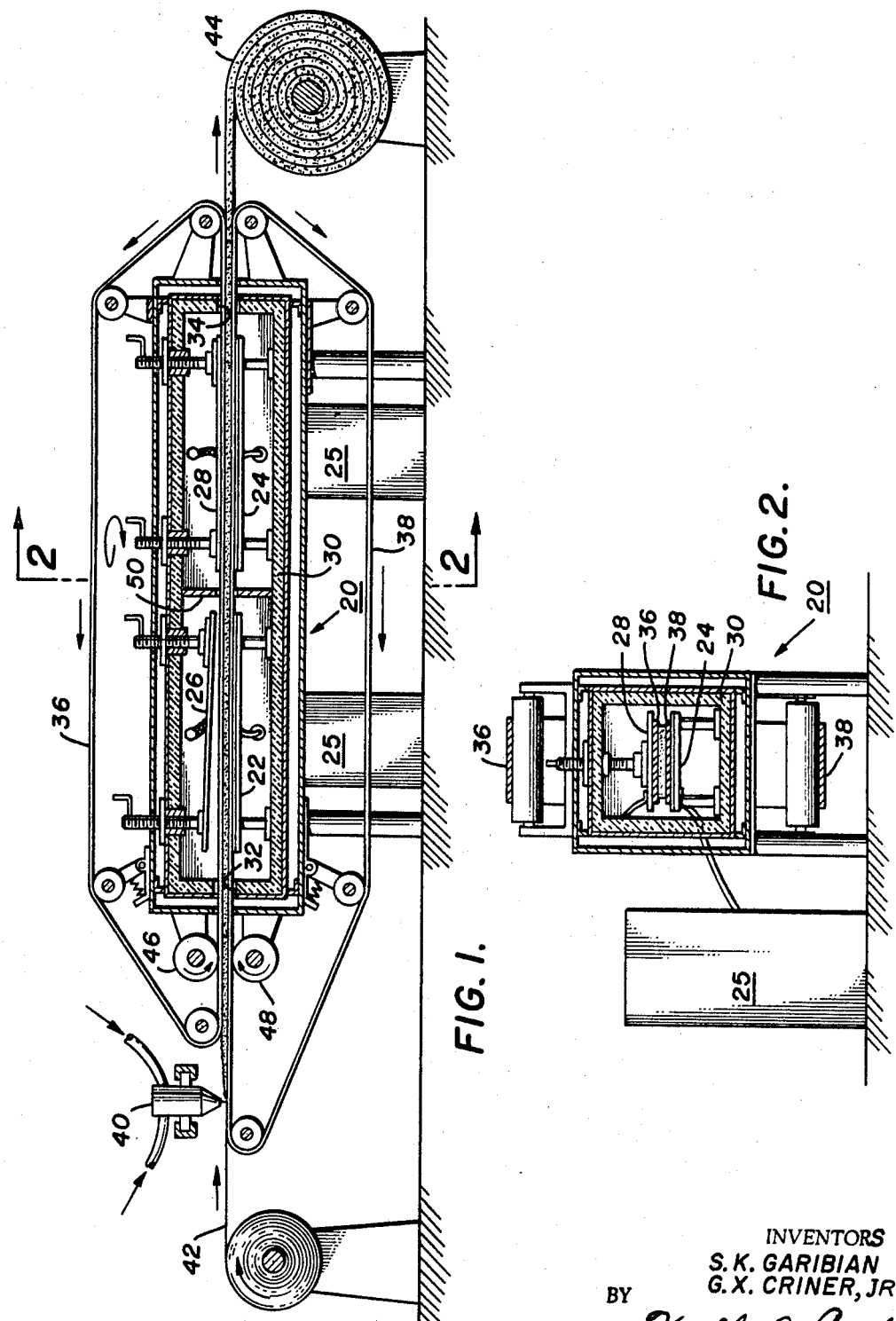

3,475,522
POLYURETHANE FOAM CURING
Sarkis K. Garibian and Gaspard X. Criner, Jr., Cary, N.C., assignors to Monsanto Company, St. Louis, Mo., a corporation of Delaware
Filed Aug. 10, 1966, Ser. No. 571,518
Int. Cl. B29h 5/26
U.S. Cl. 264—26    15 Claims

ABSTRACT OF THE DISCLOSURE

A catalyst is added to material having unreacted isocyanate and hydroxyl groups, to provide a foaming polyurethane dope mixture. The dope is spread between moving continuous belts, and is cured by exposure to an alternating electric field. The field strength E and frequency $f$ are selected so that the product $fE^2$ is held within predetermined ranges until the polyurethane foam is completely cured.

---

This invention relates to dielectric curing of polyurethane foam, and more particularly to curing such foams in continuous lengths.

Curing of polyurethane foams by application of conventional heat in an oven is unsatisfactory for making of continuous lengths since the curing time is approximately an hour or more. When making a continuous length of foam at a reasonable production rate, an enormous over size is required. Microwave curing of polyurethane foams has been suggested, using very high frequency electromagnetic radiation. This technique typically requires a large amount of auxiliary cooling equipment, and produces non-uniform heating of the foam. It has been discovered that polyurethane foams can be efficiently and rapidly cured by dielectric heating, when the dielectric heating process is carried out within certain ranges of power levels.

A primary object of the invention is to provide a process for efficiently curing polyurethane foams by controlled dielectric heating. A further object is to provide such a process adapted for production of continuous lengths of polyurethane foam. A further object is to provide such a process which is adapted for producing a foam reinforced by a fabric. Other objects of the invention will in part be obvious and will in part appear hereinafter.

For a more complete understanding of the nature and objects of the invention, reference should be had to the following detailed description taken in connection with the accompanying drawing, in which:

FIGURE 1 is a schematic vertical section of an exemplary dielectric curing apparatus according to the invention; and FIGURE 2 is a vertical section taken along line 2—2 of FIGURE 1.

FIGURE 1 illustrates an exemplary oven 20 and associated apparatus for producing a scrim-reinforced polyurethane foam in continuous lengths. Oven 20 includes lower, fixed, generally planar electrodes 22 and 24, which are aligned in a horizontal plane. Movable grounded electrodes 26 and 28 are mounted above and opposed to electrodes 22 and 24, respectively. High frequency power is supplied to electrodes 22 and 24 by suitable signal generators 25 as will be discussed below. In the preferred embodiment, the edge of electrode 26 near the entrance end of oven 20 (to the left as viewed in FIGURE 1) is spaced further from electrode 22 than the opposite edge. This provides an electric field of varying strength between electrodes 22 and 26. An insulated metal housing 30 surrounds the several electrodes, and has an entrance slit 32 at its leftmost end and an exit slit 34 at its rightmost end as viewed in FIGURE 1.

Upper and lower endless belts 36 and 38, formed of a material having a low dielectric loss, extend through slit 32 and pass between the pairs of opposed electrodes before exiting through slit 34. Woven glass fiber belts coated with polytetrafluoroethylene are suitable. Belts 36 and 38 are mounted on and guided by suitable driven rollers, and are driven at the same surface speeds. Belts 36 and 38 perform the function of endless molds for producing continuous sheets of foam. Belt 36 should exert a downward pressure on the foam of less than 7 ounces per square foot, to avoid damaging the foam. Foam nozzle 40 deposits a mixture of polyurethane prepolymer and catalyst (hereinafter referred to as "dope") on lower belt 38, which may extend further from oven 20 than upper belt 36, in order to readily receive the dope. If desired, a fabric or other reinforcing material 42 may be fed onto belt 38 in order to reinforce the finished foam. The finished product is taken up on roll 44.

It is essential that the polyurethane dope be spread to a uniform film, for example by pressure of nip rolls 46 and 48, before the foaming is complete. The dope is preferably chilled to delay evolution of foam until the dope is spread, or catalysts which will give a sufficiently slow foam evolution may be selected.

In a particular case where the prepolymer (available as Isofoam L-128 from Isocyanate Products) was the reaction product of toluene diisocyanate and polypropylene glycol, containing about 0.5 weight percent silicone oil (such as DC 190 from Dow Corning), and was mixed at nozzle 40 with a catalyst system of 2 parts water, 0.5 part triethylene diamine and 1.25 parts of N,N,N′N′-tetramethyl 1,3 butane diamine, a temperature of −10° C. at nozzle 40 was found to delay foaming satisfactorily. In this example, the prepolymer to catalyst ratio was 100/3.75.

After the foaming is substantially or entirely complete, the dope enters the pre-curing zone between electrodes 26 and 22, where it is subjected to gradually increasing dielectric heating under the influence of an increasing electrode field strength, until it is substantially non-tacky.

The freshly foamed dope can be easily damaged if heat is applied too rapidly. It has been discovered that, averaged over the first thirty seconds of exposure to the alternating electric field, the numerical value of the product $fE^2$ should not exceed $4.3 \times 10^{14}$, where $f$ is the frequency of the field in cycles per second and E is the field strength in volts per inch. This is particularly important during the first fifteen seconds of exposure to the field. For reasonably rapid precuring, the average value of the product $fE^2$ should exceed $2.7 \times 10^{11}$ since lower values are relatively ineffectual in promoting the curing reaction at a reasonably rapid rate. Therefore precuring at an effective or reasonably rapid rate only begins when the product $fE^2$ exceeds $2.7 \times 10^{11}$. Accordingly it is preferred that precuring be begun by exposure during a given period of 30 seconds to a field having an average value of $fE^2$ between $2.7 \times 10^{11}$ and $4.3 \times 10^{14}$.

During the next thirty seconds of precuring, most efficient operation is achieved when the average value of the product $fE^2$ is greater than $6.1 \times 10^{13}$ and less than $9.7 \times 10^{14}$, which latter value should not be exceeded for more than 15 seconds of this later period.

During a still later period, the third and final thirty seconds of precuring, the average value of the product $fE^2$ may be greater than $4.3 \times 10^{14}$, but should not exceed $2.2 \times 10^{15}$.

In the preferred embodiment illustrated, the dope is between electrodes 22 and 26 for about 90 seconds, and the spacing between these electrodes progressively decreases along the path of dope travel, providing an increasing field strength as the precuring progresses. When the foam leaves electrodes 22 and 26, it is substantially non-tacky.

Final curing is accomplished by electrodes 24 and 28, between which the foam next passes. A partition 50, having a slit through which belts 36 and 38 pass, divides the precuring zone from the final curing zone. This permits the final curing zone to be heated to between 115° C. and 155° C., while maintaining the precuring zone between 25° C. and 55° C.

In the precuring zone it is important to maintain the first third of the zone at no greater temperature than about 25° C. since too rapid a temperature increase of the pre-cooled polyurethane dope will cause foam collapse; while it is advantageous to precuring to maintain the latter third of the precure zone at about 45° C. to 55° C. to facilitate rapid precuring after foam or cell formation has been established.

Maintaining the final cure zone at a temperature in the range of 115° C. to 155° C. facilitates more rapid curing of the polyurethane foam. Final curing could be accomplished if the final cure zone were maintained at ambient temperature but to do so would require either longer residence time within the zone or would require curing at a higher field strength, or higher frequency.

During final curing, the foam between electrodes 24 and 28 may be exposed to an electric field having an average value of the product $fE^2$ in excess of $9.7 \times 10^{14}$, until the foam has a compression set of less than 10%, as determined by ASTM test D-1565.

As a particular example when using the prepolymer and catalyst disclosed above, electrodes 22 and 26 may be 6 feet long in the direction of foam travel when the belt moves 4 feet per minute, thus providing 90 seconds exposure of the foam to the field. Since the dielectric constant of polyurethane foam is approximately 1.5, to make a foam ¼ inch thick the edges of electrodes 22 and 26 nearest slit 32 may be spaced apart 3.83", while the opposite edges are spaced apart 0.65". When electrodes 22 and 26 are energized with 6000 volts at 27 megacycles, the field strength in the foam increases from about 1000 volts per inch at the entrance end nearest slit 32 to about 7000 volts per inch at the exit end of the precuring zone. The product $fE^2$ increases from about $2.7 \times 10^{13}$ to about $9.7 \times 10^{14}$ as the foam passes between the electrodes. The temperature varies from about 25° C. at the entrance end to about 50° C. at the exit end of the precuring zone.

Electrodes 24 and 28 may be spaced apart about 0.52 inch when energized with the same 6000 volts at 27 megacycles per second, producing a field strength in the foam of about 9000 volts/inch. An excellent final curing of the precured foam results in a further period of 60 seconds exposure, at an oven temperature of 120° C. At the foam speed of this example, electrodes 24 and 28 may be about 4 feet long.

The electrode spacings referred to in the preceding two paragraphs are based on the assumption that belts 36 and 38 have dielectric constants of substantially 1, or that their thicknesses are negligible. One skilled in the art can readily select electrode spacings to give any reasonable desired field strength when using given belts 36 and 38.

Although the several electrodes have been disclosed as planar, any electrode configurations may be used which provide the desired field strength. Other frequencies may be used if the field strengths are correspondingly modified so as to keep the product $fE^2$ within the limits indicated above.

It is not essential to all aspects of the invention that precuring be accomplished by a continuously increasing field strength. Satisfactory precuring can be achieved by changing the field strength in steps rather than continuously. Thus, using the prepolymer and catalyst noted above, excellent precuring is attained by exposing the dope for 30 seconds to a field strength at 27 megacycles of 1000 volts per inch, then for 30 seconds at 4000 volts per inch, and finally for 30 seconds at 7000 volts per inch.

As noted above the foam may be reinforced by addition of a fabric 42, on which the dope is deposited. In the case where the reinforcing fabric 42 is a loosely woven scrim-like construction, it has been found that the scrim tends to be centered in the finishd foam product, rather than being located at one side of the foam. This product has various end uses, for example, as a backing medium for tufting, as in making of tufted carpets. If a tightly woven fabric 42 is used, the foam will not substantially pentrate the fabric, and the resulting product will have the foam adhered to one side of the fabric. An additional tightly woven fabric may be added on top of the foamed dope, in which case a laminated construction is provided, wherein the foam is between two reinforcing cloth layers.

While the invention has been disclosed with a particular prepolymer and catalyst polyurethane system, it is generally applicable to foamed polymers containing the polyurethane linkage, whether produced from a prepolymer, or by direct reaction of a diisoocyanate and a polyol. Selection of suitable diisoocyanates and polyols, together with catalysts, etc., are within the scope of one skilled in the art. It may be seen from the above, that the present process efficiently and rapidly cures polyurethane foams by controlled dielectric heating. The process is well-adapted for production of continuous lengths of polyurethane foam, and is equally adapted to producing a foam reinforced by one or more layers of fabric.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for preparing continuous polyurethane foams, comprising in combination:
   (a) mixing components having unreacted isocyanate and hydroxyl groups with a catalyst system to provide a foaming dope mixture,
   (b) spreading said dope to a substantially uniform thickness between upper and lower moving continuous belts prior to substantial completion of foaming,
   (c) after foaming is substantially complete, precuring said foamed dope in a first zone by exposure to an alternating electric field, said field having, during a given period of 30 seconds of exposure, an average value of the product $fE^2$ between $2.7 \times 10^{11}$ and $4.3 \times 10^{14}$, where $f$ is the frequency of the field in cycles per second and E is the field strength in volts per inch.

2. The process defined in claim 1, wherein the temperature of said first zone during said given period is about 25° C.

3. The process defined in claim 1, wherein the average value of said product $fE^2$ during a later period of 30 seconds exposure to said electric field is greater than $6.1 \times 10^{13}$ and less than $9.7 \times 10^{14}$.

4. The process defined in claim 3, wherein the temperature of said first zone during said later period is greater than 25° C. and less than 55° C.

5. The process defined in claim 2, wherein the average value of said product $fE^2$ during a still later period of 30 seconds exposure to said electric field is greater than $4.3 \times 10^{14}$ and less than $2.2 \times 10^{15}$.

6. The process defined in claim 5, wherein the temperature of said first zone during said still later period is about 55° C.

7. The process defined in claim 1, wherein a fabric is fed between said belts with said dope.

8. The process defined in claim 7, wherein said fabric is a scrim.

9. The process defined in claim 5, further comprising curing said dope by exposure in a further zone during a further period of at least 30 seconds to an electric field having an average value of said product $fE^2$ greater than $9.7 \times 10^{14}$.

10. The process defined in claim 9, wherein the temperature of said further zone during said further period is between 115° C. and 155° C.

11. In a process for precuring a foamed polyurethane dope, the steps comprising:
(a) introducing said foamed dope into a zone; and
(b) exposing said foamed dope while in said zone to an alternating electric field having a frequency $f$ in cycles per second and a field strength E in volts per inch such that the product $fE^2$ is within the range of $2.7 \times 10^{11}$ and $4.3 \times 10^{14}$ when averaged over a given period of at least fifteen seconds.

12. The process defined in claim 11, further comprising exposing said foamed dope to an alternating electric field having a product $fE^2$ within the range of $6.1 \times 10^{13}$ and $9.7 \times 10^{14}$ when averaged over a later period of thirty seconds subsequent to said given period.

13. In a process for precuring a foamed polyurethane dope, the steps comprising:
(a) introducing said foamed dope into a zone; and
(b) exposing said foamed dope while in said zone to an alternating electric field having a frequency $f$ in cycles per second and a field strength E in volts per inch such that the product $fE^2$ increases from a lower value between $2.7 \times 10^{11}$ and $4.3 \times 10^{14}$ to a higher value between $4.3 \times 10^{14}$ and $2.2 \times 10^{15}$ during a time period sufficiently long to render the foam substantially non-tacky.

14. The process defined in claim 13, wherein said product $fE^2$ increases continuously from said lower to said higher value.

15. In a process for final curing a precured polyurethane foam, the steps comprising:
(a) introducing said foam into a zone maintained at a temperature between 115° C. and 155° C.; and
(b) exposing said foam while in said zone to an alternating electric field having a frequency $f$ in cycles per second and a field strength E in volts per inch such that the product $fE^2$ is in excess of $9.7 \times 10^{14}$ until said foam has a compression set of less than 10% as determined by ASTM Test D-1565.

References Cited

UNITED STATES PATENTS

| | | |
|---|---|---|
| 2,320,624 | 3/1945 | Gillespie. |
| 2,822,573 | 2/1958 | Wasniewski et al. |
| 3,072,960 | 1/1963 | Smythe et al. |
| 3,209,056 | 9/1965 | Jacobs _____ 264—45 XR |
| 2,841,205 | 7/1958 | Bird _____ 264—47 |

OTHER REFERENCES

Stengard, R. A.: "Pressures Developed in Closed Molding of Frothed Rigid Foam." Du Pont "Hylene" Urethane Foam Bulletin, Elastomer Chemicals Dept., Apr. 26, 1961, all pages.

PHILIP E. ANDERSON, Primary Examiner

U.S. Cl. X.R.

264—47, 54, 236; 18—4.5; 219—10.69, 10.65, 10.81; 260—2.5